July 19, 1955     H. J. HINMAN     2,713,525
REEL BUSHING
Filed April 25, 1952

INVENTOR.
Henry J. Hinman
BY

United States Patent Office 2,713,525
Patented July 19, 1955

2,713,525

REEL BUSHING

Henry J. Hinman, North Anson, Maine

Application April 25, 1952, Serial No. 284,413

3 Claims. (Cl. 308—237)

This invention relates to reels and spools and is more particularly concerned with a new and improved bushing for use in the heads of reels and spools for holding coiled lengths of electrical cable, wire hoisting cable and the like, in which the heads are composed of at least two laminations or layers, usually of non-metallic material such as wood.

It is usual in large reels of this type to provide a pair of laminated heads which may be composed, for example, of two layers of wood, with the grain running at right angles, and a hub or barrel portion mounted between such heads on which the cable or wire rope is wound, the heads being drawn to each other by tension bolts to retain the barrel, and the laminations of each head being clamped together at their axis by a bushing suitably formed to clench the adjacent portions of the heads. The bushing furnishes a bearing surface to receive a shaft or spindle permitting the reel to be rotatably mounted for loading or unloading of cable.

A noticeable defect in those bushings of the prior art which are formed of solid tubing simply belled over and back into the wood is the tendency of the bushings to turn in their seats when subjected to the great torsional forces produced by rotation on a shaft when the reel is heavily loaded. Once the bushing has become loose, it works back and forth and quickly wears away the adjacent portions of the two or more layers of the head thereby greatly shortening the useful life of the reel even though there has been very little wear of the barrel or other portions of the heads. This defect is particularly true of reels more than 30″ in diameter. An important factor in the working loose of these bushings formed of solid tubing is their inability to expand and contract to compensate for swelling and shrinking of the wood.

Heretofore it has been proposed to check this tendency of the cylindrical bushing easily to loosen by providing a series of peripheral teeth on the two flanges thereof, turned first radially outwardly and then back into the adjacent portions of the wooden laminations which make up the head. The principal defect of these bushings, I believe, is the fact that the surfaces of the teeth formed in this manner lie generally within a surface of revolution which can be drawn about the axis of the reel. Thus, the flat sides of the teeth are facing in the wrong direction to counteract the shearing forces produced by torque applied to the bushing.

By the present invention, I have successfully overcome these drawbacks of prior art structures and it is an important object of the invention to provide a new and improved bushing equally applicable to large and small reels and which will be non-slipping and hence non-wearing and will stand up well even under conditions of considerable abuse.

Another object of the invention is to provide a new and improved bushing of the type described which may be readily formed by means of conventional machinery and which may be installed in the heads of the usual reel having laminated heads, without the need for any special tools or for altering the general structure of the reel heads.

Still another object of the invention is to provide a bushing of the type described formed in such a way as to change its diameter with swelling and shrinking of the wood in which it is held and thus to remain intimately locked in its seat even when the reel is subjected to varying weather conditions.

Yet another object of the invention is the provision of a new and greatly improved reel bushing which, when in place in a reel of large diameter, will greatly prolong the useful life of the latter by its ability to remain tightly seated, firmly gripping adjacent portions of the reel head even when subjected to very substantial torsional forces, varying both in amount and in direction.

With the foregoing objects in mind, the invention is featured by the provision, for use in a reel having a head and a bushing seat in such head, of a new and improved bushing for mounting in said seat, the bushing being adapted to receive a shaft or spindle for rotatably holding the reel. My new bushing comprises a piece of strong resilient sheet metal which is turned into a generally cylindrical form with the adjacent edges in spaced apart relation to permit expansion and contraction in a radial direction. A portion of the periphery thereof is extended radially outwardly to form a gripping flange generally parallel with the axis of the bushing and adapted to bite into and firmly engage the adjacent inner surface of the bushing seat thereby effectively preventing turning movement of the bushing in either direction, even when subjected to great torsional forces. I prefer to form the flanges of the invention by turning outwardly portions of both of the adjacent edges of the cylindrical bushing, in the manner indicated, for greater security of locking with the bushing seat, but it will be apparent that for some purposes a single flange or leg will suffice. The inner and outer lateral edges of the bushing are also turned radially outwardly and then belled back upon and into the adjacent portions of the laminated head for clenching the same together and locking the bushing against movement in an axial direction.

Still other objects, advantages and features of the invention will become apparent from the following detailed description of a preferred embodiment thereof taken in connection with the accompanying drawings in which like numerals refer to like parts in the several views and in which.

Figure 1:
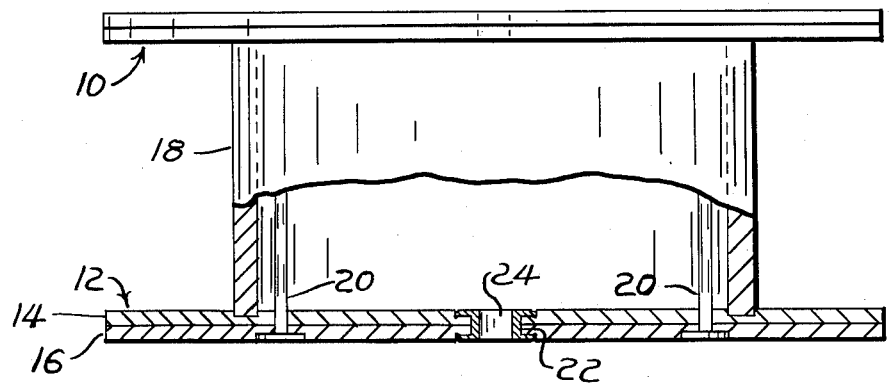
Fig. 1 is a plan view partly in section and with portions broken away of a heavy-duty laminated reel having mounted therein the novel bushing of the invention.

Referring first to Fig. 1, it will be seen that the reel, which is conventional in form and structure, comprises a pair of laminated heads 10 and 12 with a barrel 18 therebetween composed of any suitable material or combination of materials. The head 12 is made up of a pair of disks 14 and 16 joined together to form a laminated structure. It will be understood that the other head 10 is made up in a similar manner and will not be described in detail.

Between the heads is mounted a cylindrical barrel portion 18 which may be composed of metal or a series of wooden staves or be of any other suitable, well-known construction. The edges of the barrel fit into a circular groove in each head and are held firmly by the clamping of the two heads together by tension bolts 20, all in accordance with the usual practice.

Each of the heads is provided with an axial opening 22 forming a bushing seat for receiving the bushing 24 of the invention.

Figure 2:
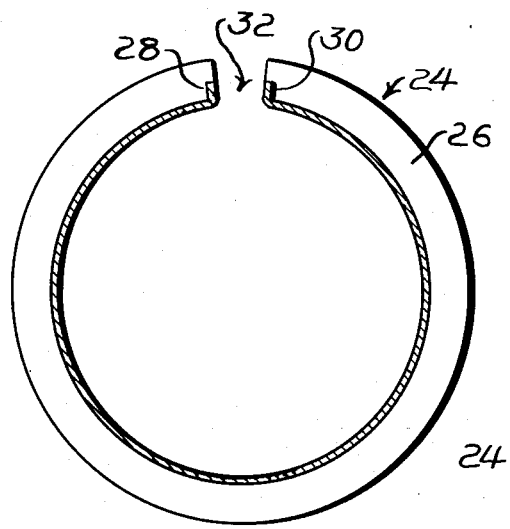
Fig. 2 is a vertical longitudinal section of the bushing itself.
Figure 3:
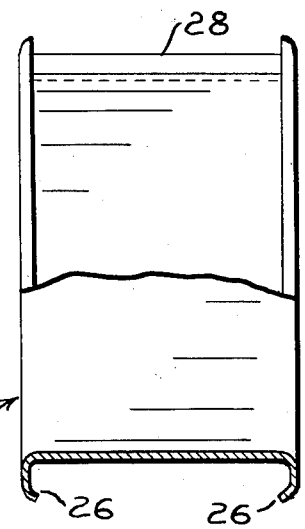
Fig. 3 is a side view of the same with portions broken away.

Referring now to Figs. 2 and 3, showing my novel bushing in detail, it will be seen that the same consists of a strong piece of resilient sheet metal bent into cylindrical form and provided with lateral radially outwardly extending flanges 26 belled back for biting into the adjacent portions of the members 14 and 16 to clench the same firmly together. The turning outwardly and backwardly of one or both of these clenching flanges may be accomplished after the bushing is inserted in its seat or before installation in a manner hereinafter indicated.

The adjacent edges of the bushing (parallel to the axis thereof) are turned radially outwardly to form a pair of spaced parallel legs or flanges 28 and 30 which, after the bushing is inserted in its seat, are forced outwardly to bite into the adjacent material of the members 14 and 16, thereby locking the bushing against rotational movement in either direction.

The novel bushing 24 according to the invention may be formed on suitable conventional tools, cheaply and on a mass production basis. If desired the partially formed bushings may be compressed to a smaller diameter and installed in their seats with either no flange 26 or with one flange 26 already turned outwardly, and the gripping flanges 28 and 30 also turned in their final direction, and then be caused to expand into final locked position. The space indicated by the numeral 32 between the flanges 28 and 30 is sufficient to permit springing the flanges 28 and 30 together, thus reducing the diameter of the bushing sufficiently to force it into its seat and further to permit expanding and contracting of the bushing without losing its grip in its seat responsive to swelling or shrinking of the material of which the head is built. Alternatively, the bushings may be installed prior to forming the flanges 26 and the latter may then be turned outwardly and back toward each other to bite into the respective adjacent layers of the head.

While the usual reel is composed of wood, it will be understood that other suitable materials may be employed, and hence the hatching of Fig. 1 of the drawings should not be taken to indicate any particular material. The improved bushing of the invention is thus adapted for use with reels composed of a variety of construction materials. Once installed, my novel bushing is effectively anchored against turning in either direction since the gripping surfaces of both the flanges 28 and 30 face in the proper directions to provide the largest possible anchoring area for resisting rotation in the bushing seat. I have found that bushings, according to the invention, will stay firmly seated without appreciably working loose for much longer periods, even under conditions of hard service, than ordinary tubular bushings having no outward locking flange and no gap to permit expansion and contraction corresponding to changes in the diameter of its seat in the reel head due to shrinking and swelling action of the wood.

While I have herein disclosed and described a preferred embodiment of the invention, it will be understood that the same is susceptible of various modifications and changes within the spirit and scope of the appended claims.

I claim:

1. For use in a reel having a head and a bushing seat in said head, a bushing for mounting in said seat for receiving a shaft or spindle for rotatably holding said reel, said bushing comprising a piece of resilient sheet metal turned into generally cylindrical form with its adjacent edges in spaced apart generally parallel relation to permit expansion and contraction thereof, a portion of the periphery of said bushing being formed into a radially outwardly extending gripping flange parallel with the axis of said bushing, said flange being adapted to bite into the adjacent surface of said seat to prevent turning of said bushing in said seat in either direction, and the lateral edges of said bushing being turned radially outwardly for clenching therebetween the adjacent portions of said head.

2. For use in a reel having a head and a bushing seat in said head, a bushing for mounting in said seat for receiving a shaft or spindle for rotatably holding said reel, said bushing comprising a piece of resilient sheet metal turned into generally cylindrical form with its adjacent edges in spaced apart generally parallel relation to permit expansion and contraction thereof, a portion of at least one of said edges being turned outwardly to form a radially extending gripping flange, said flange being in a plane generally parallel with the axis of said bushing and adapted to bite into the adjacent surface of said seat to prevent turning of said bushing in said seat in either direction, and the lateral edges of said bushing being turned radially outwardly for clenching therebetween the adjacent portions of said head.

3. An article in accordance with claim 1 in which gripping flanges are formed on both of said adjacent edges.

References Cited in the file of this patent

UNITED STATES PATENTS

| | | |
|---|---|---|
| 1,130,336 | Renkenberger | Mar. 2, 1915 |
| 1,753,342 | Hubbard | Apr. 8, 1930 |
| 1,865,423 | Atwood | July 5, 1932 |
| 1,997,550 | O'Leary | Apr. 9, 1935 |
| 2,487,726 | Powell | Nov. 8, 1949 |